(12) United States Patent
Ortiz

(10) Patent No.: US 11,394,741 B1
(45) Date of Patent: Jul. 19, 2022

(54) SYSTEMS AND METHODS FOR HINDERING MALICIOUS COMPUTING ACTIONS

(71) Applicant: Symantec Corporation, Mountain View, CA (US)

(72) Inventor: Efrain Ortiz, Conshohocken, PA (US)

(73) Assignee: NortonLifeLock Inc., Tempe, AZ (US)

( * ) Notice: Subject to any disclaimer, the term of this patent is extended or adjusted under 35 U.S.C. 154(b) by 757 days.

(21) Appl. No.: 15/855,690

(22) Filed: Dec. 27, 2017

(51) Int. Cl.
  *H04L 9/40* (2022.01)
  *G06F 21/55* (2013.01)
  *G06Q 20/40* (2012.01)
  *G06F 21/62* (2013.01)
  *G06Q 20/06* (2012.01)
  *G06Q 20/36* (2012.01)
  *H04L 9/06* (2006.01)

(52) U.S. Cl.
  CPC ...... *H04L 63/1441* (2013.01); *G06F 21/6245* (2013.01); *G06Q 20/0655* (2013.01); *G06Q 20/3678* (2013.01); *G06Q 20/4014* (2013.01); *H04L 9/0637* (2013.01); *H04L 63/1416* (2013.01); *G06Q 2220/00* (2013.01); *H04L 2209/38* (2013.01); *H04L 2209/56* (2013.01)

(58) Field of Classification Search
  CPC .. G06F 21/00; G06F 21/55; G06F 21/56–577; G06F 21/70; G06F 21/6245; G06F 21/50–556; H04L 63/1441; H04L 9/0637; H04L 63/1416; H04L 2209/38; H04L 2209/56; G06Q 20/0655; G06Q 20/3678; G06Q 20/4014; G06Q 2220/00
  See application file for complete search history.

(56) References Cited

U.S. PATENT DOCUMENTS

| | | | | |
|---|---|---|---|---|
| 5,892,900 A | * | 4/1999 | Ginter | G06F 21/10 726/26 |
| 6,775,780 B1 | * | 8/2004 | Muttik | G06F 21/53 713/165 |
| 8,201,246 B1 | * | 6/2012 | Wu | G06F 21/554 726/22 |
| 9,189,629 B1 | * | 11/2015 | Nachenburg | G06F 21/12 |

(Continued)

OTHER PUBLICATIONS

Andreas M. Antonopoulos, "Mastering Bitcoin", Copyright @ 2010.*

(Continued)

*Primary Examiner* — Steven S Kim
(74) *Attorney, Agent, or Firm* — FisherBroyles, LLP

(57) ABSTRACT

The disclosed computer-implemented method for hindering malicious computing actions may include (i) identifying an attempt by an agent to perform an action on a computing resource that is vulnerable to attempted actions performed by unauthorized agents, (ii) requesting from the agent, in response to identifying the attempt to perform the action on the computing resource, a payment to an owner of the computing resource equal to a monetary value assigned to performing the action on the computing resource, (iii) receiving, by the owner of the computing resource, the payment of the monetary value from the agent, and (iv) allowing, in response to receiving the payment of the monetary value from the agent, the attempt by the agent to perform the action on the computing resource. Various other methods, systems, and computer-readable media are also disclosed.

19 Claims, 8 Drawing Sheets

(56) References Cited

U.S. PATENT DOCUMENTS

| | | | |
|---|---|---|---|
| 2012/0254993 A1* | 10/2012 | Sallam | H04L 63/0227 |
| | | | 726/22 |
| 2014/0281317 A1* | 9/2014 | Garman | G06F 11/1448 |
| | | | 711/162 |
| 2018/0025332 A1* | 1/2018 | Huang | G06Q 20/10 |
| | | | 705/71 |

OTHER PUBLICATIONS

Mankins et al., "Mitigating distributed denial of service attacks with dynamic resource pricing," Seventeenth Annual Computer Security Applications Conference, 2001, pp. 411-421.*

Fighting Email Spam with Bitcoin Micro-transactions, Feb. 20, 2015.

* cited by examiner

US 11,394,741 B1

SYSTEMS AND METHODS FOR HINDERING MALICIOUS COMPUTING ACTIONS

BACKGROUND

As digital data and control sharing formats become standardized, the possibility of a catastrophic system-wide attack becomes ever more likely. The high speed and low cost of communicating quickly online enables lightning-fast communications for positive purposes, but also for malicious purposes. The ability to quickly transfer large amounts of data is a boon to legitimate users and identity thieves alike. Critical infrastructure and engines of commerce are exposed to nefarious actors who, with a few keystrokes, are able to leverage the power of the network to destroy portions of it. Many barriers already exist between malicious actors and critical systems, including hardware and software firewalls, anti-malware applications, authorization and authentication systems, and security systems of all types.

Unfortunately, traditional systems may do little or nothing to hinder an attacker who has breached these outer layers of security systems and gained access to protected resources. Many traditional systems for securing computing systems may have no defense against insider threats from properly authorized and authenticated users who have become disgruntled and now wish to do damage to critical systems or to steal protected data. A legitimate user with malicious intentions or an attacker who has gained access to a legitimate user's account can cause catastrophic damage if unchecked. The instant disclosure, therefore, identifies and addresses a need for systems and methods for hindering malicious computing actions.

SUMMARY

As will be described in greater detail below, the instant disclosure describes various systems and methods for hindering malicious computing actions.

In one example, a computer-implemented method for hindering malicious computing actions may include (i) identifying an attempt by an agent to perform an action on a computing resource that is vulnerable to attempted actions performed by unauthorized agents, (ii) requesting from the agent, in response to identifying the attempt to perform the action on the computing resource, a payment to an owner of the computing resource equal to a monetary value assigned to performing the action on the computing resource, according to a transfer scheme such that a payment by an authorized agent transfers the monetary value between an account pertaining to the owner of the computing resource and an additional account pertaining to the owner of the computing resource and a payment by an unauthorized agent transfers the monetary value from a user represented by the unauthorized agent to the owner of the computing resource, (iii) receiving, by the owner of the computing resource, the payment of the monetary value from the agent, and (iv) allowing, in response to receiving the payment of the monetary value from the agent, the attempt by the agent to perform the action on the computing resource.

In one embodiment, receiving, by the owner of the computing resource, the payment of the monetary value from the agent may include receiving the payment via a cryptocurrency that records transactions in a public ledger. In one embodiment, the agent may include a user account.

In one example, identifying the attempt by the agent to perform the action on the computing resource may include identifying an attempt by the agent to perform the action on a group of computing resources. In this example, requesting from the agent the payment to the owner of the computing resource equal to the monetary value assigned to performing the action on the computing resource may include calculating the monetary value based at least in part on a total number of computing resources in the computing resources. In some examples, calculating the monetary value based at least in part on the total number of computing resources in the computing resources may include calculating the monetary value by applying a superlinear function to the total number of computing resources in the computing resources.

In one example, the computer-implemented method may further include (i) identifying an additional attempt by the agent to perform an additional action on an additional computing resource within a predetermined time period of allowing the attempt to perform the action on the computing resource, (ii) calculating an increased monetary value based at least in part on identifying the additional attempt within the predetermined time period of allowing the attempt to perform the action, and (iii) requesting from the agent, in response to identifying the additional attempt, an additional payment to the owner of the additional computing resource equal to the increased monetary value. In some examples, calculating the increased monetary value may include applying a superlinear function to a total number of computing resources targeted by actions performed by the agent within the predetermined time period.

In some examples, identifying the attempt by the agent to perform the action on the computing resource may include determining that performing the action on the computing resource requires the payment based at least in part on a type of the action and/or a classification of the computing resource. Additionally or alternatively, requesting from the agent the payment to the owner of the computing resource equal to the monetary value assigned to performing the action on the computing resource may include calculating the monetary value of the action based at least in part on a type of the action and/or a classification of the computing resource.

In some examples, the action may include a transfer of data from a first computing system to a second computing system. In some embodiments, the computer-implemented method may include sending an encrypted version of the data from the first computing system to the second computing system before receiving the payment from the agent and allowing, in response to receiving the payment of the monetary value from the agent, the attempt by the agent to perform the action may include sending a decryption key for the encrypted version of the data from the first computing system to the second computing system.

In one embodiment, the computer-implemented method may further include distributing, from the owner of the computing resource to a wallet assigned to an authorized user represented by the agent, prior to the agent attempting to perform the action on the computing resource, a predetermined amount of cryptocurrency. In one example, receiving, by the owner of the computing resource, the payment of the monetary value from the agent may include transferring cryptocurrency from the wallet assigned to the authorized user to the owner of the computing resource. In some embodiments, distributing, from the owner of the computing resource to the wallet assigned to the authorized user represented by the agent, the predetermined amount of cryptocurrency may include distributing the predetermined amount of cryptocurrency from the owner of the computing resource to the wallet at regular intervals. In one embodiment, the wallet may be associated with a physical token and/or may only be accessed by a user when the user is in possession of the physical token.

In one example, the computing resource may include an application, the action may include an update of the application, and the agent may include a process performing the update of the application. In one embodiment, the computer-implemented method may further include supplying, by a distributor of the update for the application, a predetermined amount of cryptocurrency that is accessible by the process performing the update of the application and receiving, by the owner of the computing resource, the payment of the monetary value from the agent may include receiving, by the owner of the computing resource, from the process performing the update of the application, at least a portion of the predetermined amount of cryptocurrency supplied by the distributor of the update.

In one embodiment, the computer-implemented method may further include (i) identifying an additional attempt by the agent to perform an additional action on an additional computing resource, (ii) requesting from the agent, in response to identifying the additional attempt, an additional payment, (iii) failing to receive the additional payment from the agent, and (iv) denying, in response to failing to receive the additional payment from the agent, the additional attempt by the agent to perform the additional action on the additional computing resource. In some examples, identifying the attempt by the agent to perform the action on the computing resource may include monitoring attempts to perform actions on a computing system.

In one embodiment, a system for implementing the above-described method may include (i) an identification module, stored in memory, that identifies an attempt by an agent to perform an action on a computing resource that is vulnerable to attempted actions performed by unauthorized agents, (ii) a request module, stored in memory, that requests from the agent, in response to identifying the attempt to perform the action on the computing resource, a payment to an owner of the computing resource equal to a monetary value assigned to performing the action on the computing resource, according to a transfer scheme such that a payment by an authorized agent transfers the monetary value between an account pertaining to the owner of the computing resource and an additional account pertaining to the owner of the computing resource and a payment by an unauthorized agent transfers the monetary value from a user represented by the unauthorized agent to the owner of the computing resource, (iii) a receiving module, stored in memory, that receives, by the owner of the computing resource, the payment of the monetary value from the agent, (iv) an allowing module, stored in memory, that allows, in response to receiving the payment of the monetary value from the agent, the attempt by the agent to perform the action on the computing resource, and (v) at least one physical processor configured to execute the identification module, the request module, the receiving module, and the allowing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify an attempt by an agent to perform an action on a computing resource that is vulnerable to attempted actions performed by unauthorized agents, (ii) request from the agent, in response to identifying the attempt to perform the action on the computing resource, a payment to an owner of the computing resource equal to a monetary value assigned to performing the action on the computing resource, according to a transfer scheme such that a payment by an authorized agent transfers the monetary value between an account pertaining to the owner of the computing resource and an additional account pertaining to the owner of the computing resource and a payment by an unauthorized agent transfers the monetary value from a user represented by the unauthorized agent to the owner of the computing resource, (iii) receive, by the owner of the computing resource, the payment of the monetary value from the agent, and (iv) allow, in response to receiving the payment of the monetary value from the agent, the attempt by the agent to perform the action on the computing resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
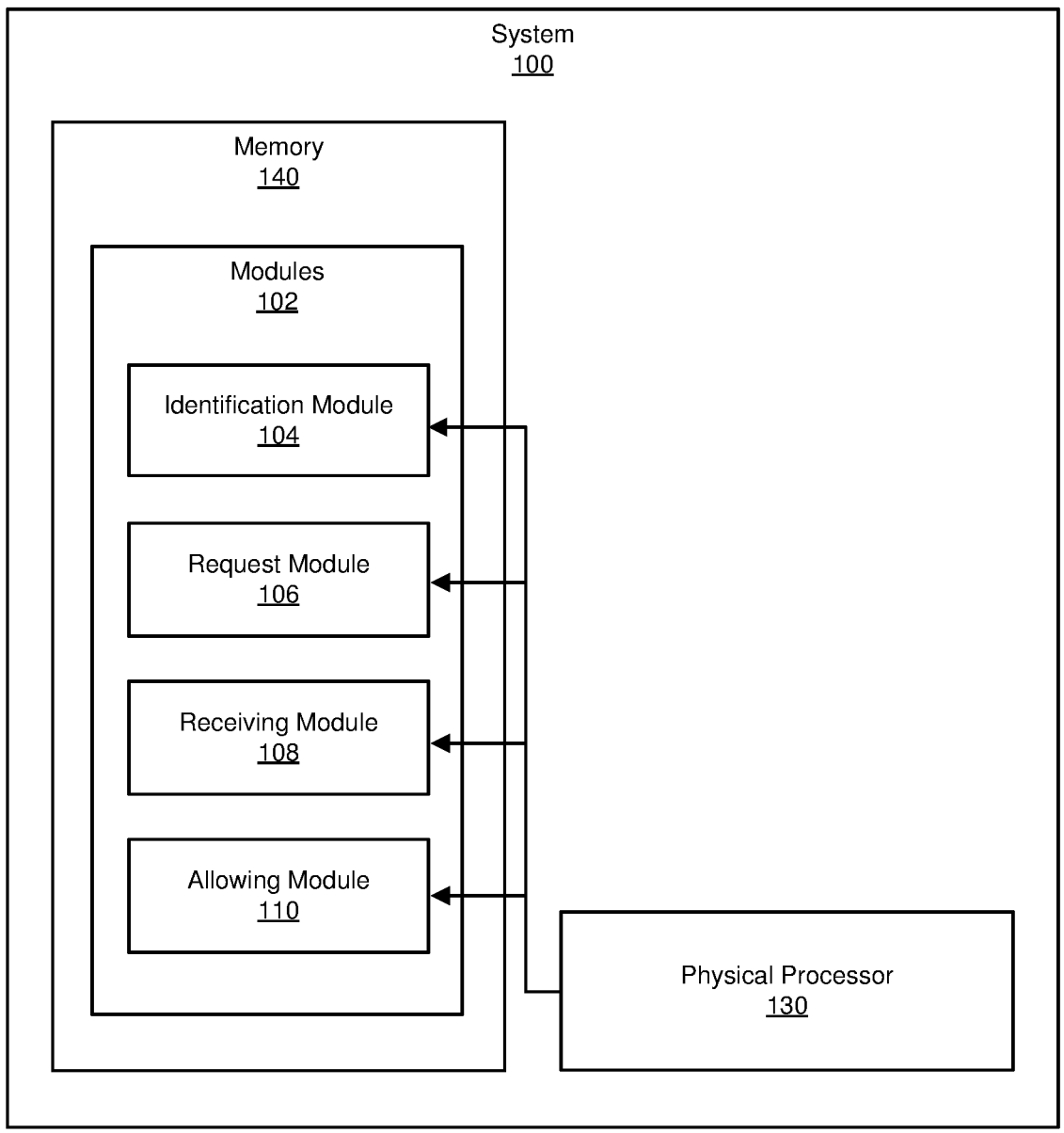
FIG. 1 is a block diagram of an example system for hindering malicious computing actions.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for hindering malicious computing actions. As will be explained in greater detail below, by requiring a payment for each action that affects a computing resource, the systems and methods described herein may hinder a malicious user from performing actions without preventing legitimate users from performing actions. By transferring payments to an account owned by the owner of the computing resource, the systems and methods described herein may deter malicious users from performing large numbers of actions and/or gain reimbursement for victims of malicious users, thereby reducing the harm caused by malicious actors who have gained access to computing resources. In addition, the systems and methods described herein may improve the functioning of a computing device by reducing the likelihood of an attacker targeting the device for malicious actions and/or reducing the quantity of malicious actions performed on the device by an attacker and thus reducing the computing device's likelihood of compromise. These systems and methods may also improve the field of computer security by employing an additional layer of defense against an attacker who has breached other defenses to gain access to a system.

Figure 2:
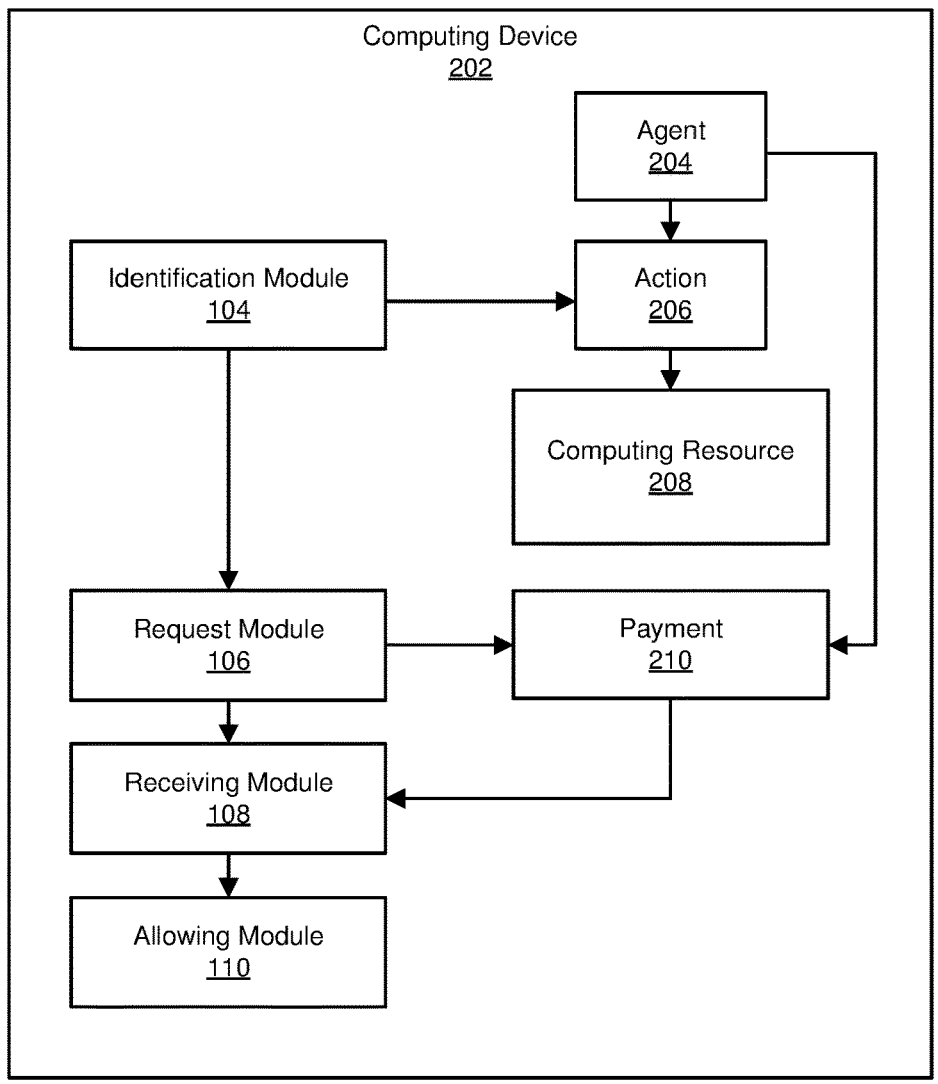
FIG. 2 is a block diagram of an additional example system for hindering malicious computing actions.
Figure 5:
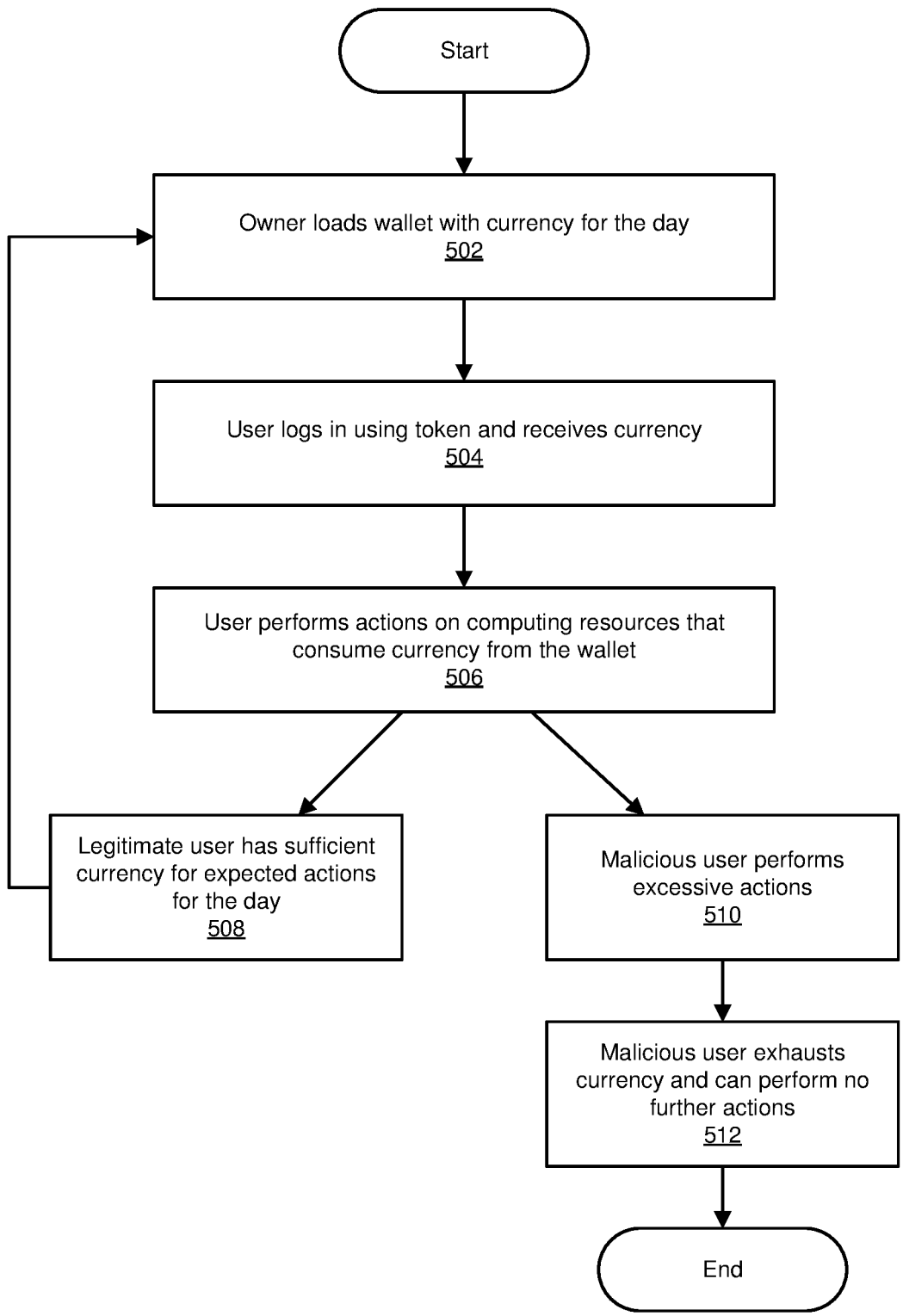
FIG. 5 is a flow diagram of an example method for hindering malicious computing actions.
Figure 6:
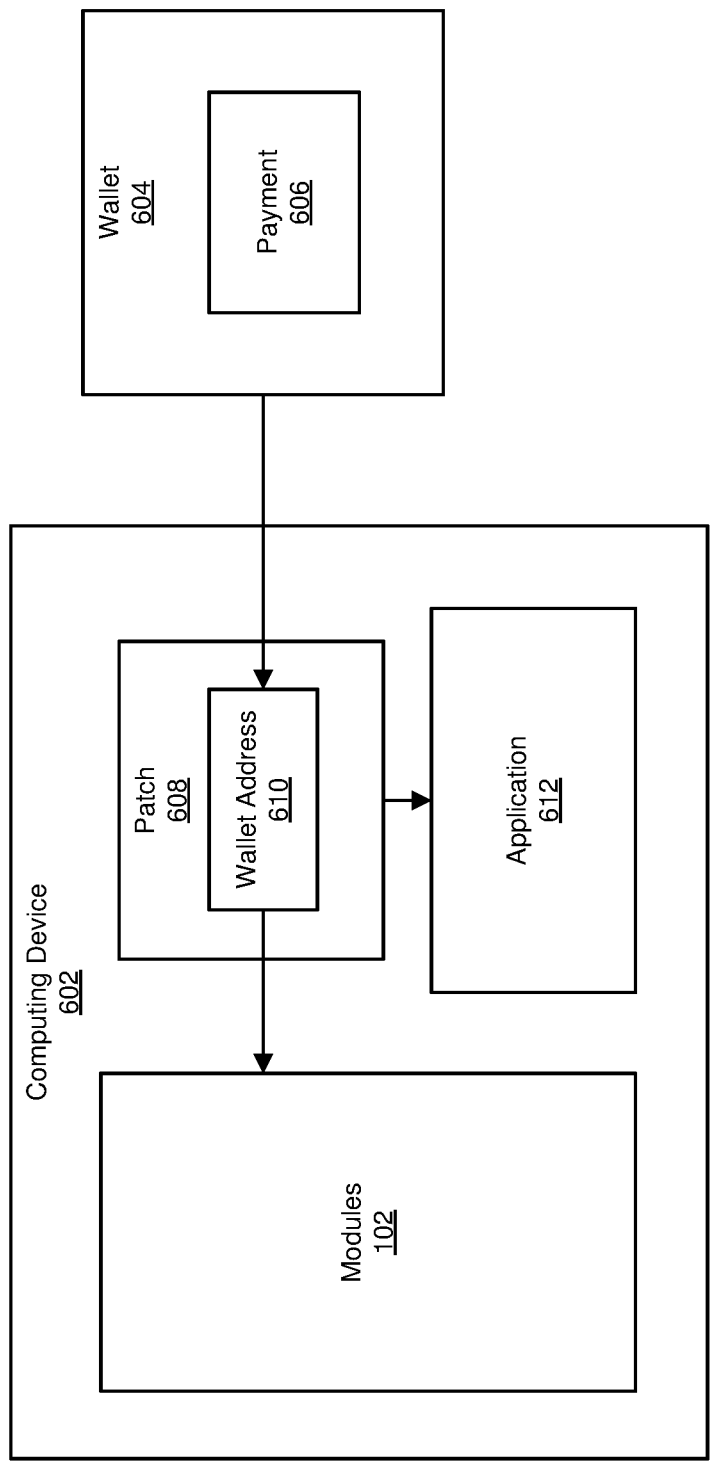
FIG. 6 is a block diagram of an example computing system for hindering malicious computing actions.

The following will provide, with reference to FIGS. 1, 2, and 6, detailed descriptions of example systems for hindering malicious computing actions. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 7 and 8, respectively.

FIG. 1 is a block diagram of example system 100 for hindering malicious computing actions. As illustrated in this figure, example system 100 may include one or more modules 102 for performing one or more tasks. For example, and as will be explained in greater detail below, example system 100 may include an identification module 104 that identifies an attempt by an agent to perform an action on a computing resource that is vulnerable to attempted actions performed by unauthorized agents. Example system 100 may additionally include a request module 106 that requests from the agent, in response to identifying the attempt to perform the action on the computing resource, a payment to an owner of the computing resource equal to a monetary value assigned to performing the action on the computing resource, according to a transfer scheme such that a payment by an authorized agent transfers the monetary value between an account pertaining to the owner of the computing resource and an additional account pertaining to the owner of the computing resource and a payment by an unauthorized agent transfers the monetary value from a user represented by the unauthorized agent to the owner of the computing resource. Example system 100 may also include a receiving module 108 that receives, by the owner of the computing resource, the payment of the monetary value from the agent. Example system 100 may additionally include an allowing module 110 that allows, in response to receiving the payment of the monetary value from the agent, the attempt by the agent to perform the action on the computing resource. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate hindering malicious computing actions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device to hinder malicious computing actions. For example, and as will be described in greater detail below, identification module 104 may identify an attempt by an agent 204 to perform an action 206 on a computing resource 208 that is vulnerable to attempted actions performed by unauthorized agents. Immediately, request module 106 may request from agent 204, in response to identifying the attempt to perform action 206 on the computing resource, a payment 210 to an owner of computing resource 208 equal to a monetary value assigned to performing action 206 on the computing resource, according to a transfer scheme such that a payment 210 by an authorized agent transfers the monetary value between an account pertaining to the owner of computing resource 208 and an additional account pertaining to the owner of computing resource 208 and a payment 210 by an unauthorized agent transfers the monetary value from a user represented by the unauthorized agent to the owner of the computing resource. In some examples, receiving module 108 may receive, by the owner of the computing resource, payment 210 of the monetary value from agent 204. Next, allowing module 110 may allow, in response to receiving payment 210 of the monetary value from agent 204, the attempt by agent 204 to perform action 206 on the computing resource.

Computing device 202 generally represents any type or form of computing device capable of reading computer-executable instructions. In some examples, computing device 202 may be a personal computing device used by an individual user. In other examples, computing device 202 may be another type of computing device, such as a server or an embedded device. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Agent 204 generally represents any type or form of account and/or process capable of initiating actions on a computing system. Action 206 generally represents any type of computing action. Computing resource 208 generally represents any type of computing system and/or object on a computing system. Payment 210 generally represents any transfer of monetary value from one or more accounts into one or more other accounts.

Figure 3:
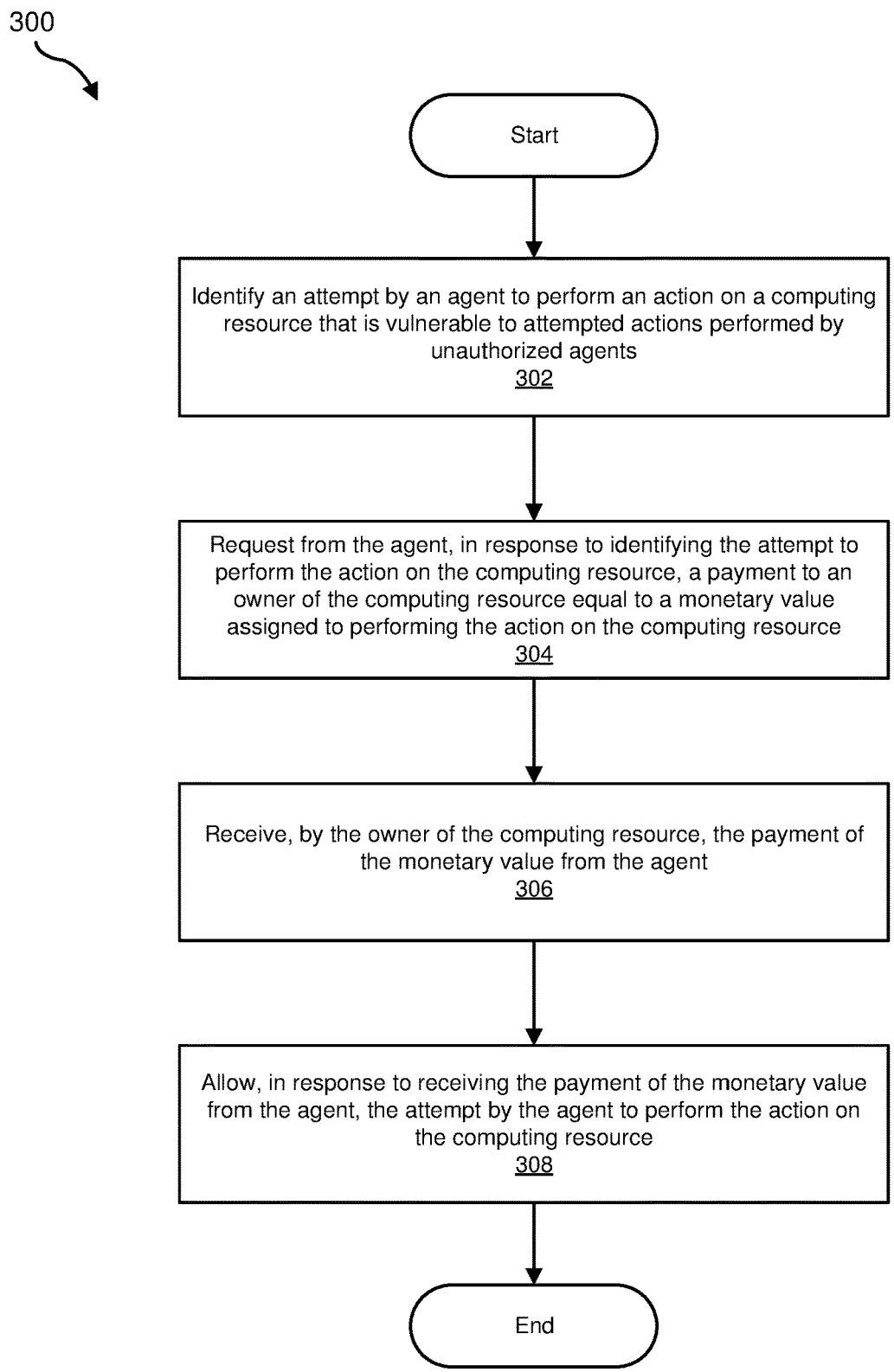
FIG. 3 is a flow diagram of an example method for hindering malicious computing actions.

FIG. 3 is a flow diagram of an example computer-implemented method 300 for hindering malicious computing actions. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify an attempt by an agent to perform an action on a computing resource that is vulnerable to attempted actions performed by unauthorized agents. For example, identification module 104 may, as part of computing device 202 in FIG. 2, identify an attempt by agent 204 to perform action 206 on computing resource 208 that is vulnerable to attempted actions performed by unauthorized agents.

The term "agent," as used herein, generally refers to any process, representative of a user, application, and/or other computing element capable of performing actions on a computing system. In one example, the agent may be a user account. In other examples, the agent may be a process. For example, the agent may be a process performing a software update, a process that is configured to automatically transfer and/or otherwise manipulate data (e.g., a process that ingests data for a logging and/or analytics service), and/or a process executed by a computing system as a result of an exploit such as a buffer overflow.

The term "unauthorized agent," as used herein, generally refers to any agent that is not authorized to perform the action attempted by the agent and/or any agent that is attempting to perform an action for malicious purposes. For example, a process triggered by an exploit may be an unauthorized agent. In some embodiments, each user account may be authorized to perform a certain number of actions within a given timespan and may become an unauthorized agent if the user account continues to initiate actions after hitting that limit. For example, a user account may be provisioned with enough monetary value to pay for the actions the user would typically take during a standard workday. In some examples, a user account that has been compromised by an attacker and/or that is currently being used for malicious purposes by a disgruntled employee to perform a large number of malicious actions may prematurely expend the monetary value and become an unauthorized agent.

The term "action," as used herein, generally refers to any type or form of computing action. Examples of an action may include, without limitation, modifying settings of a computing system, user account, and/or application, installing, uninstalling, updating, launching, shutting down, and/or configuring an application, creating, copying, deleting, transferring, encrypting, unencrypting, and/or otherwise modifying data and/or objects, and/or launching and/or killing a process.

The term "computing resource," as used herein, generally refers to any computing system, computing device, application, software, object, file, configuration setting, and/or combination thereof. In some examples, the computing resource may be the computing device on which systems described herein are executing.

Identification module 104 may identify the attempt to perform the action on the computing resource in a variety of ways and/or contexts. In some embodiments, identification module 104 may identify the attempt to perform the action on the computing resource by monitoring attempts to perform actions on a computing system. In one embodiment, identification module 104 may operate at the authentication layer of a computing system. In some embodiments, identification module 104 may operate at the kernel level of a computing system. In some examples, identification module 104 may monitor all calls to functions that perform read, write, execute, and/or access operations. In one example, identification module 104 may begin monitoring actions initiated by a user account when a user logs in to the user account. In some embodiments, identification module 104 and/or other components of the systems described herein may be part of an anti-malware system, a security application, a data loss prevention system, an intrusion prevention system, and/or an authentication application.

In some embodiments, identification module 104 may identify the attempt by the agent to perform the action on the computing resource by determining that performing the action on the computing resource requires the payment based at least in part on a type of the action and/or a classification of the computing resource. In some examples, certain types of actions may require payments while other types of actions may not require payments. For example, opening a document may not require a payment but encrypting, copying, and/or deleting the document may require a payment.

Additionally or alternatively, some computing resources may be targeted by actions without requiring a payment while targeting other computing resources with actions may require payments. In some examples, computing resources may be classified by type and/or priority. For example, actions that affect a sensitive database containing confidential information may require a payment while actions that affect a test database containing dummy information may not require a payment. In another example, altering the settings on a security application such as a firewall and/or anti-malware application may require a payment while altering the settings on a non-security application such as a document viewer may not require a payment. In one example, performing actions on a computing system marked as critical may require a payment while performing actions on a computing system marked as non-critical may not require a payment.

At step 304, one or more of the systems described herein may request from the agent, in response to identifying the attempt to perform the action on the computing resource, a payment to an owner of the computing resource equal to a monetary value assigned to performing the action on the computing resource, according to a transfer scheme such that a payment by an authorized agent transfers the monetary value between an account pertaining to the owner of the computing resource and an additional account pertaining to the owner of the computing resource and a payment by an unauthorized agent transfers the monetary value from a user represented by the unauthorized agent to the owner of the computing resource. For example, request module 106 may, as part of computing device 202 in FIG. 2, request from agent 204, in response to identifying the attempt to perform action 206 on the computing resource, payment 210 to an owner of computing resource 208 equal to a monetary value assigned to performing action 206 on the computing resource, according to a transfer scheme such that payment 210 by an authorized agent transfers the monetary value between an account pertaining to the owner of computing resource 208 and an additional account pertaining to the owner of computing resource 208 and payment 210 by an unauthorized agent transfers the monetary value from a user represented by the unauthorized agent to the owner of the computing resource.

The term "payment," as used herein, generally refers to transfer of monetary value from at least one account to at least one other account. In some examples, a payment may have a monetary value in a specified currency, such as United States dollars. In some embodiments, a payment may be a cryptocurrency payment that transfers an amount of cryptocurrency of a specified value from one cryptocurrency wallet to another.

The term "owner," as used herein, generally refers to an individual and/or organization that administers the computing resource and/or computing system that hosts the computing resource. In some examples, an owner may be a legal owner of a physical computing device, such as the owner of a desktop, laptop, and/or smartphone. In one example, an owner may be a corporation or other legal entity that owns and/or administers a computing system.

The phrase "account pertaining to the owner," as used herein, generally refers to any account that is directly or indirectly owned and/or controlled by the owner of the computing resource. For example, a personal account of an owner may be an account pertaining to the owner. In another example, multiple different corporate accounts for a corporation may all be accounts pertaining to the corporation. In one example, an account designed for use by an employee of an organization may be an account pertaining to the organization. For example, an enterprise may have individual accounts for each developer and/or systems administrator that make payments to an account for the enterprise whenever the respective developer and/or systems administrator performs an action on a computing resource.

Request module 106 may request the payment in a variety of ways. For example, request module 106 may request a payment of the monetary value and provide the agent with several ways of making the payment. In another embodiment, request module 106 may specify both the value and the method of payment. In one embodiment, request module 106 may display and/or transmit a quick response code that is associated with a payment address.

In one embodiment, request module 106 may request the payment of the monetary value from the agent by requesting the payment via a cryptocurrency that records transactions in a public ledger. The term "cryptocurrency," as used herein, generally refers to any digital currency in which encryption techniques are used to verify the possession and/or transfer of funds and/or regulate the generation of units of currency. The term "public ledger," as used herein, generally refers to any publicly-accessible and verifiable record of transactions performed using a cryptocurrency. In some examples, a public ledger may include a blockchain. Examples of cryptocurrencies that use a public ledger may include, without limitation, BITCOIN, LITECOIN, DOGECOIN, and/or ETHEREUM.

In one embodiment, identification module 104 may identify the attempt by the agent to perform the action on a group of computing resources and request module 106 may calculate the monetary value based at least in part on the total number of computing resources in the group of computing resources. In some embodiments, request module 106 may calculate the monetary value by applying a superlinear function to the total number of computing resources in the group. In some example, request module 106 may apply an exponential function to the total number of resources. For example, request module 106 may calculate a monetary value of $0.05 to transfer a single file, $0.10 to transfer two files, $0.20 to transfer three files, $0.40 to transfer four files, $0.80 to transfer five files, and so forth.

In some embodiments, request module 106 may take into account prior actions performed by the agent when calculating the monetary value. For example, identification module 104 may identify an additional attempt by the agent to perform an additional action on an additional computing resource within a predetermined time period of allowing the attempt to perform the action on the computing resource and request module 106 may calculate an increased monetary value based at least in part on identifying the additional attempt within the predetermined time period of allowing the attempt to perform the action.

In some examples, the predetermined time period may be the same for all actions and/or computing resources. In other examples, more critical computing resources and/or more potentially dangerous actions may have longer predetermined time periods than less critical and/or dangerous resources and/or actions. For example, attempts to modify security settings may have a predetermined time period of 24 hours for the purposes of calculating the monetary value while attempts to open files may have a predetermined time period of ten seconds. In some embodiments, request module 106 may calculate the increased monetary value by applying a superlinear function to a total number of computing resources targeted by actions performed by the agent within the predetermined time period. In some embodiments, request module 106 may only consider computing resources of the same type as the computing resource currently being targeted while in other embodiments, request module 106 may include all computing resources targeted by actions performed by the agent within the predetermined time period.

In some examples, request module 106 may calculate the monetary value of the action based at least in part on a type of the action and/or a classification of the computing resource. For example, request module 106 may calculate higher monetary values for actions that target computing resources categorized as high priority and/or critical. In some examples, request module 106 may calculate higher monetary values for types of actions that are more likely to be risky, such as changes to security settings, password changes, and/or file transfers, than actions that are less likely to be dangerous, such as opening a document. Additionally or alternatively, request module 106 may factor in other components of an action and/or computing resource, such as ports used, registry keys affected, dynamic linked libraries called, signature, size of resource affected, access control list attached to the object, and/or the specific application affected. In one example, executing and/or installing an unsigned process and/or a process that has not been identified by a security system may have a higher monetary value than executing and/or installing a known trusted process. In some embodiments, authenticating as an administrator may have a higher monetary value than authenticating as a non-administrative user. In one embodiment, the monetary value of performing an action on a computing resource may be based at least partially on the classification of the action and/or computing resource by a standards body, such as the NATIONAL INSTITUTE OF STANDARDS AND TECHNOLOGY and/or the CENTER FOR INTERNET SECURITY.

In some embodiments, the monetary value of the current action may be affected by the types of actions performed previously by the agent and/or previous targets of actions taken by the agent. For example, if the agent recently changed the security settings on a computing system categorized as critical, request module 106 may request a higher payment for changing the security settings on a different computing system that is not categorized as critical than would be requested if the agent had not recently affected the critical system.

Figure 4:
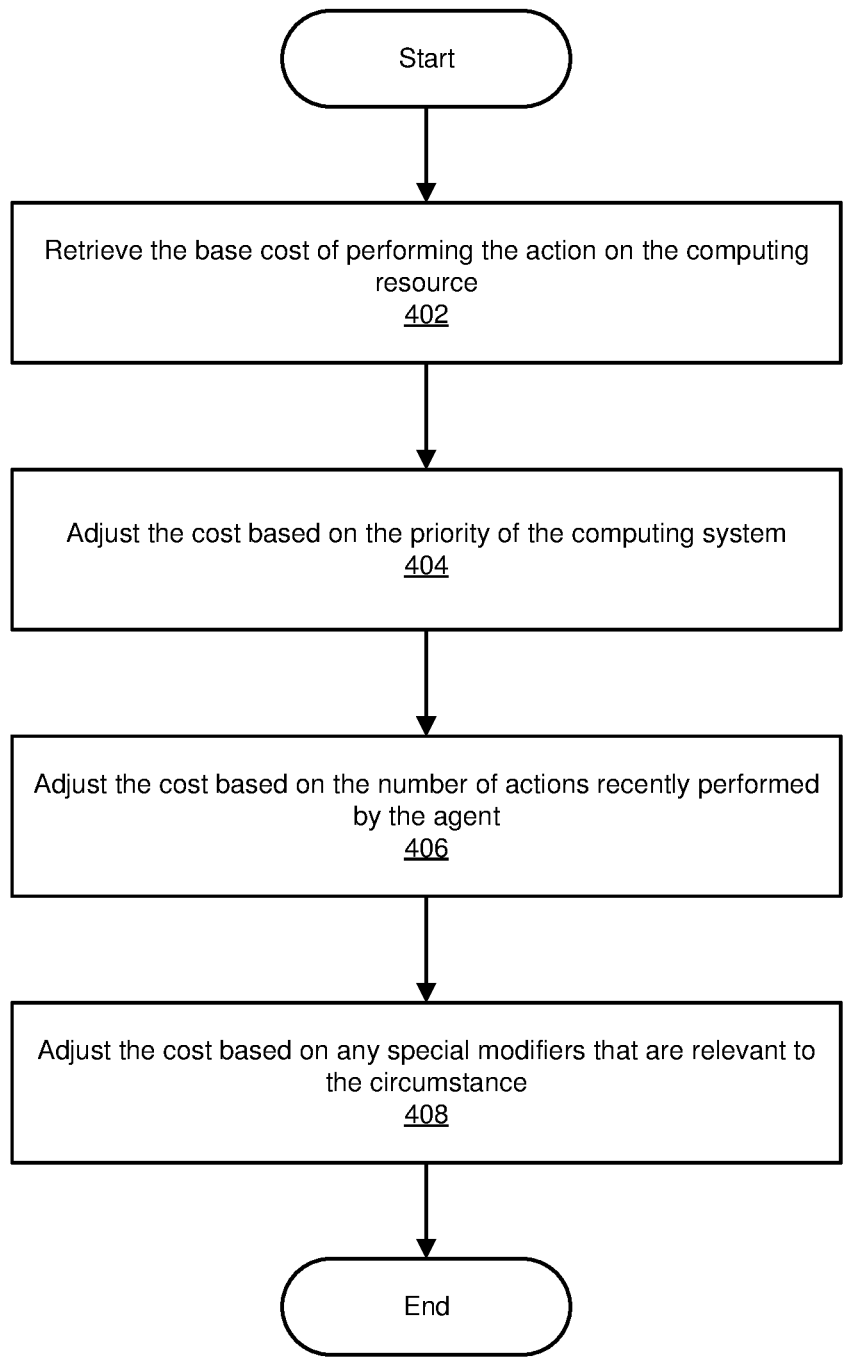
FIG. 4 is a flow diagram of an example method for hindering malicious computing actions.

In some embodiments, the systems described herein may go through a number of steps to calculate the monetary value of performing the action on the computing resource. For example, as illustrated in FIG. 4, at step 402, the systems described herein may retrieve the base cost of performing the action on the computing resource. In some embodiments, every computing resource on a computing system may be stored in a tree and tagged with the monetary value of each relevant action. In some examples, at step 404, the systems described herein may adjust the cost based on the priority of the computing system. For example, the systems described herein may increase the cost if the computing system is marked as high priority. In some examples, at step 406, the systems described herein may adjust the cost based on the number of actions recently performed by the agent. For example, the cost for each successive action may increase exponentially if multiple actions are performed within a predetermined time period. In some examples, at step 408, the systems described herein may adjust the cost based on any special modifiers that are relevant to the circumstance. For example, if the agent has recently performed a suspicious action and/or performed actions on a critical computing system, the systems described herein may increase the cost of subsequent actions.

Returning to FIG. 3, at step 306, one or more of the systems described herein may receive, by the owner of the computing resource, the payment of the monetary value from the agent. For example, receiving module 108 may, as part of computing device 202 in FIG. 2, receive, by the owner of the computing resource, payment 210 of the monetary value from agent 204.

Receiving module 108 may receive the payment in a variety of ways. In one embodiment, receiving module 108 may receive the payment of the monetary value from the agent by receiving the payment via a cryptocurrency that records transactions in a public ledger.

In some examples, receiving module 108 may receive the payment into an account directly owned by the owner of the computing resource. In other examples, receiving module 108 may receive the payment into an account indirectly owned by the owner of the computing resource. For example, an administrator may set up a separate account to receive payments for each computing device in a network. In some examples, the administrator may separate accounts in this way for auditing, logging, and/or forensic purposes. For example, the administrator may be able to quickly identify abnormal activity on a computing device by determining that the account associated with the device contains a higher-than-expected amount of money. In another example, an administrator may determine that a user's activity is suspicious based on the user's account having participated in a higher-than-average number of transactions involving a specific device and/or transactions involving an unusual number of devices. In one embodiment, the systems described herein may correlate tickets in a ticketing system to transactions performed on a computing system. In some examples, transactions that do not correlate to a ticket may be flagged as suspicious.

At step 308, one or more of the systems described herein may allow, in response to receiving the payment of the monetary value from the agent, the attempt by the agent to perform the action on the computing resource. For example, allowing module 110 may, as part of computing device 202 in FIG. 2, allow, in response to receiving payment 210 of the monetary value from agent 204, the attempt by agent 204 to perform action 206 on the computing resource.

Allowing module 110 may allow the attempt in a variety of ways. For example, if the systems described herein intercepted a request to a function, allowing module 110 may forward the intercepted request. In some examples, the systems described herein may enable part of an action to take place before receiving a payment and allowing module 110 may finalize the action in response to receiving the payment.

In one example, the action may be a data transfer between one computing system and another. In some embodiments, the systems described herein may encrypt the data and then allow the encrypted data to be transferred between computing systems before receiving the payment. Upon receipt of the payment, allowing module 110 may send the decryption key for the encrypted data to the computing system that received the encrypted data, allowing the computing system to decrypt the requested data. In this way, the systems described herein may hinder malicious agents from obtaining sensitive data without reducing the speed at which legitimate agents may transfer data. In various embodiments, the systems described herein may perform actions by initiating a resource-intensive action before receiving payment (thereby reducing apparent latency that might otherwise be caused by waiting for a payment transaction to finalize) but preventing the action from being completed in a form that is useful to a potential attacker until after payment is received.

In some examples, the systems described herein may prevent an agent from performing an action if the systems described herein do not receive payment from the agent. For example, an attacker may compromise a legitimate user account of a user that is allotted a limited amount of currency to perform actions. In this example, the attacker may run out of currency before performing all of the malicious actions intended by the attacker and may then be blocked from taking further actions. In another example, the legitimate owner of a user account may attempt to perform malicious actions and may similarly be limited by the amount of currency allotted to the account. Additionally or alternatively, an attacker may trigger an exploit such as a buffer overflow, but may be prevented from performing actions because the process initiated by the buffer overflow is not associated with an account that contains currency and/or is associated with an account for system processes that contains a limited amount of currency.

In some examples, the systems described herein may prevent a legitimate user from inadvertently performing damaging actions. For example, a developer may run a script that is intended to change only a few rows in a database but in actuality would change every row of the database. In this example, the developer's account may run out of currency before all of the database changes are complete and/or may be blocked from performing any of the changes if the cost of the bulk transaction exceeds the amount of currency in the developer's account, preventing the developer from accidentally making widespread database changes.

In some embodiments, the payment record created by the systems described herein may aid an administrator in investigating an incident. Because attempts to perform actions on computing resources require payments, each action performed on a computing resource may be associated with a transaction that may include a user account and/or a timestamp. Additionally, administrators may be able to set alerts for when an account associated with a user and/or a computing system has an unusually large number of transactions, providing administrators with an additional method for detecting potentially malicious activity.

In some examples, an owner of a computing resource may transfer currency to a user of the computing resource to enable the user to take actions that affect the computing resource. For example, as illustrated in FIG. 5, at step 502, the owner may load a digital wallet with currency for the day. In one example, the systems described herein may enable the owner to configure an automated process to distribute appropriate amounts of currency to the wallet of each user at a set time each workday. In some embodiments, a wallet may be associated with a physical token used for authentication, such as a key fob that generates a cryptographic code and/or a smartphone configured with an authentication application. At step 504, a user may log in to a computing system using the physical token and may then receive access to the currency allocated to the wallet associated with the physical token. At step 506, the user may perform one or more actions on computing resources that consume currency from the wallet. At step 508, a legitimate user may continue performing actions during the course of a normal work day and may have sufficient currency in the wallet to pay for all of those actions. In some embodiments, any currency remaining in the wallet at the end of the work day may be transferred back to the owner and/or deducted from the next day's allotment of currency in order to avoid a buildup of excess currency in the wallet. In some examples, at step 510, a malicious user may attempt to perform an excessive number of actions, such as transferring a large amount of sensitive data, wiping data, encrypting data, and/or changing security settings. At step 512, the user may exhaust the currency associated with the wallet and may be blocked from performing further actions, limiting the ability of the user to perform malicious actions. In some embodiments, the administrator may be alerted that the wallet is out of currency.

In some examples, the agent may be a process that is updating an application with a patch. For example, as illustrated in FIG. 6, a computing device 602 may host modules 102 and an application 612 that is being updated with a patch 608. In some embodiments, a developer and/or distributor of patch 608 may hardcode a wallet address 610 into patch 608 that points to wallet 604 that contains a supply of cryptocurrency to pay for the installation of patch 608 on one or more computing systems. In some examples, modules 102 may request and receive payment 606 from the process applying patch 608.

As explained in connection with method 300 above, the systems and methods described herein may hinder malicious actions on computing systems by requiring a payment for each action. By preventing actions that are not accompanied by a payment, the systems and methods described herein may prevent processes caused by exploits such as buffer overflows from performing any actions. Additionally, by issuing user accounts with limited amounts of currency, the systems described herein may limit the harm caused by a disgruntled user or a carelessly written script. Malicious actors who wish to perform a large number of malicious actions, such as encrypting all the files on a computing system for ransomware or extracting a large amount of data from sensitive databases, may be prevented from completing those actions or forced to use their own money to compensate the owner of the affected computing system.

Figure 7:
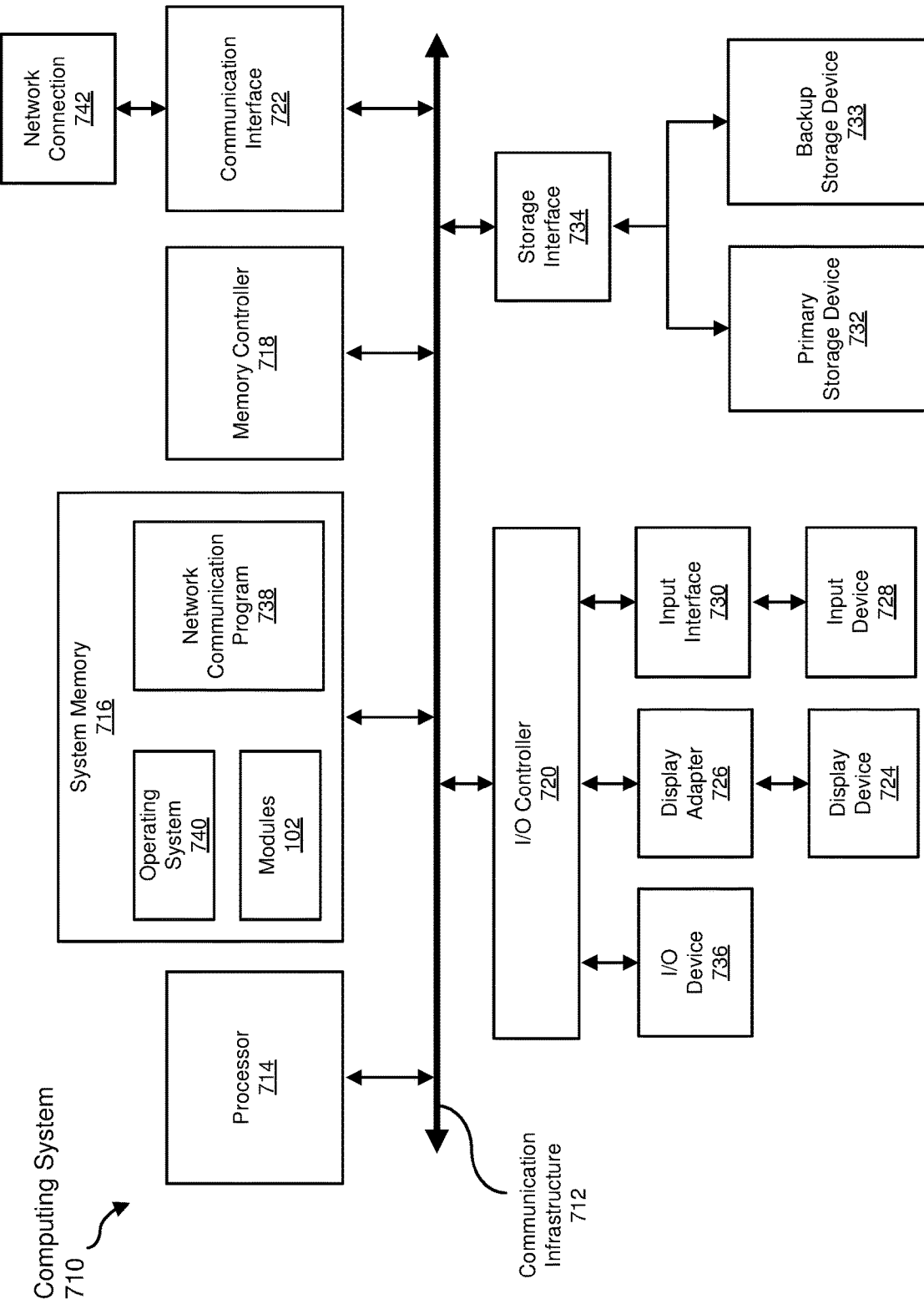
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
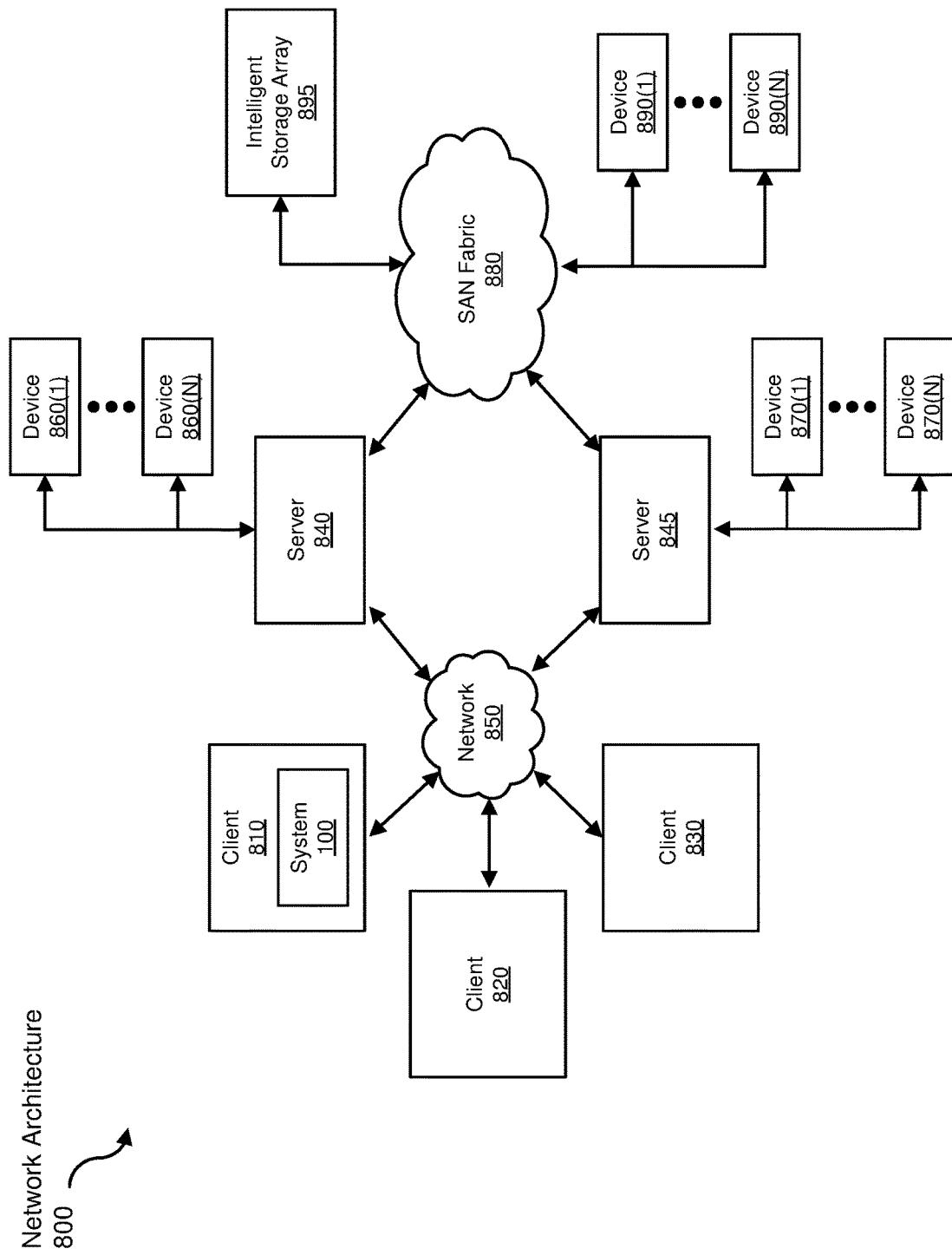
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for hindering malicious computing actions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive information about an attempted action to be transformed, transform the information about the attempted action by calculating a monetary value of the action, output a result of the transformation to a request module, use the result of the transformation to request a payment of the monetary value, and store the result of the transformation to memory and/or a log file. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for hindering malicious computing actions, the method comprising:
    monitoring, by a software security system of a computing device, attempts to perform actions on computing resources of the computing device;
    intercepting, by the software security system, a first attempt by an agent executing on the computing device to perform a first action on a computing resource of the computing device, thereby preventing the first action from execution;
    in response to the software security system intercepting the first attempt to perform the first action, calculating, by the software security system, a first monetary value of the first action based at least in part on both a type of the first action and a time since the agent last attempted to perform actions on the computing device;
    determining, by the software security system, an account of the owner of the computing resource, wherein the account of the owner is configured to receive digital currency;
    determining, by the software security system, a wallet of the agent associated with a user, wherein the wallet is configured to transfer digital currency to the account of the owner;
    determining, by the software security system, that the wallet of the agent has sufficient funds to cover the first monetary value of the first action;
    in response to determining that the wallet of the agent has sufficient funds, requesting, by the software security system, a first payment of the first monetary value from the agent, wherein the first payment is transferred by the agent between the wallet of the agent and the account of the owner;
    in response to the account of the owner receiving the first payment, permitting, by the software security system, the first action on the computing resource;
    intercepting, by the software security system, a second attempt by the agent to perform a second action on the computing resource of the computing device, thereby preventing the second action from execution;
    in response to the software security system intercepting the second attempt, calculating, by the software security system, a second monetary value of the second action based at least in part on both a type of the second action and a time since the agent last attempted to perform actions on the computing device;
    determining, by the software security system, that the wallet of the agent has insufficient funds to cover the first monetary value of the second action;
    in response to determining that the wallet of the agent has insufficient funds, requesting, by the software security system, a second payment of the second monetary value to the account of the owner of the computing resource from the user; and
    in response to the account of the owner receiving the second payment, permitting, by the software security system, the second action on the computing resource.

2. The computer-implemented method of claim 1, wherein the account of the owner receiving the second payment comprises receiving the second payment via a cryptocurrency that records transactions in a public ledger.

3. The computer-implemented method of claim 1, wherein the agent comprises a user account of the user.

4. The computer-implemented method of claim 1, wherein:
    the first action and the second action each comprises action on a plurality of computing resources; and
    the calculating the first monetary value and the second monetary value comprises calculating the first monetary value and the second monetary value based at least in part on a total number of computing resources in the plurality of computing resources.

5. The computer-implemented method of claim 4, wherein the calculating the first monetary value and the second monetary value based at least in part on the total number of computing resources in the plurality of computing resources comprises calculating the first monetary value and the second monetary value by applying a superlinear function to the total number of computing resources in the plurality of computing resources.

6. The computer-implemented method of claim 1, further comprising:
intercepting an additional attempt by the agent to perform an additional action on an additional computing resource within a predetermined time period of allowing the attempt to perform the second action on the computing resource;
calculating an increased monetary value based at least in part on identifying the additional attempt within the predetermined time period of allowing the attempt to perform the action; and
in response to identifying the additional attempt, requiring the user to submit an additional payment to the account of the owner equal to the increased monetary value.

7. The computer-implemented method of claim 6, wherein the calculating the increased monetary value comprises applying a superlinear function to a total number of computing resources targeted by actions performed by the agent within the predetermined time period.

8. The computer-implemented method of claim 1, wherein the intercepting the first attempt and the second attempt by the agent to perform the first action and the second action on the computing resource comprises determining that performing the first action and the second action on the computing resource requires the payment based at least in part on: a type of the action; and a classification of the computing resource.

9. The computer-implemented method of claim 1, wherein the calculating the first monetary value of the first action comprises calculating the first monetary value of the first action and the second monetary value of the second action based at least in part on: a type of the action; and a classification of the computing resource.

10. The computer-implemented method of claim 1,
wherein the second action comprises a transfer of data from a first computing system to a second computing system;
further comprising sending an encrypted version of the data from the first computing system to the second computing system before receiving the second payment; and
wherein the permitting the second action on the computing resources in response to the account of the owner receiving the second payment comprises sending a decryption key for the encrypted version of the data from the first computing system to the second computing system.

11. The computer-implemented method of claim 1, further comprising
distributing, from the account of the owner to the wallet of the agent, prior to the agent attempting to perform the first action and the second action on the computing resource, a predetermined amount of cryptocurrency; and
wherein the first payment transferred by the agent between the wallet of the agent and the account of the owner comprises transferring cryptocurrency.

12. The computer-implemented method of claim 11, wherein the distributing, from the account of the owner to the wallet of the agent, the predetermined amount of cryptocurrency comprises distributing the predetermined amount of cryptocurrency from the account of the owner to the wallet of the agent at regular time intervals.

13. The computer-implemented method of claim 11, wherein the wallet of the agent is associated with a physical token and can only be accessed by the user when the user is in possession of the physical token.

14. The computer-implemented method of claim 1,
wherein: the computing resource comprises an application, the action comprises an update of the application, and the agent comprises a process performing the update of the application;
wherein the method further comprises loading the wallet of the agent y supplying, by a distributor of the update for the application, a predetermined amount of cryptocurrency that is accessible by the process performing the update of the application; and
wherein the account of the owner receiving the first payment of the first monetary value from the wallet of the agent comprises receiving, at the account of the owner, from the wallet of the agent associated with the process performing the update of the application, at least a portion of the predetermined amount of cryptocurrency supplied by the distributor of the update.

15. The computer-implemented method of claim 1, further comprising:
intercepting an additional attempt by the agent to perform an additional action on an additional computing resource;
requesting from the agent, in response to intercepting the additional attempt, an additional payment;
failing to receive the additional payment on behalf of the agent; and
denying, in response to failing to receive the additional payment on behalf of the agent, the additional attempt by the agent to perform the additional action on the additional computing resource.

16. A system for hindering malicious computing actions, the system comprising
one or more physical processors and
one or more memories coupled to one or more of the physical processors, the one or more memories comprising instructions operable when executed by the one or more physical processors to cause the one or more physical processors to perform operations comprising:
monitoring, by a software security system of a computing device, attempts to perform actions on computing resources of the computing device;
intercepting, by the software security system, a first attempt by an agent executing on the computing device to perform a first action on a computing resource of the computing device, thereby preventing the first action from execution;
in response to the software security system intercepting the first attempt to perform the first action, calculating, by the software security system, a first monetary value of the first action based at least in part on both a type of the first action and a time since the agent last attempted to perform actions on the computing device;
determining, by the software security system, an account of the owner of the computing resource, wherein the account of the owner is configured to receive digital currency;
determining, by the software security system, a wallet of the agent associated with a user, wherein the wallet is configured to transfer digital currency to the account of the owner;
determining, by the software security system, that the wallet of the agent has sufficient funds to cover the first monetary value of the first action;
in response to determining that the wallet of the agent has sufficient funds, requesting, by the software security system, a first payment of the first monetary value from the agent, wherein the first payment is transferred by the agent between the wallet of the agent and the account of the owner;

in response to the account of the owner receiving the first payment, permitting, by the software security system, the first action on the computing resource;

intercepting, by the software security system, a second attempt by the agent to perform a second action on the computing resource of the computing device, thereby preventing the second action from execution;

in response to the software security system intercepting the second attempt, calculating, by the software security system, a second monetary value of the second action based at least in part on both a type of the second action and a time since the agent last attempted to perform actions on the computing device;

determining, by the software security system, that the wallet of the agent has insufficient funds to cover the first monetary value of the second action;

in response to determining that the wallet of the agent has insufficient funds, requesting, by the software security system, a second payment of the second monetary value to the account of the owner of the computing resource from the user; and in response to the account of the owner receiving the second payment, permitting, by the software security system, the second action on the computing resource.

17. The system of claim 16, wherein the account of the owner receiving the second payment comprises receiving the second payment via a cryptocurrency that records transactions in a public ledger.

18. The system of claim 16, wherein the agent comprises a user account of the user.

19. A non-transitory computer-readable medium comprising one or more computer-readable instructions that, when executed by at least one processor of a computing device, cause the at least one processor to perform the operation comprising:

monitoring, by a software security system of the computing device, attempts to perform actions on computing resources of the computing device;

intercepting, by the software security system, a first attempt by an agent executing on the computing device to perform a first action on a computing resource of the computing device, thereby preventing the first action from execution;

in response to the software security system intercepting the first attempt to perform the first action, calculating, by the software security system, a first monetary value of the first action based at least in part on both a type of the first action and a time since the agent last attempted to perform actions on the computing device;

determining, by the software security system, an account of the owner of the computing resource, wherein the account of the owner is configured to receive digital currency;

determining, by the software security system, a wallet of the agent associated with a user, wherein the wallet is configured to transfer digital currency to the account of the owner;

determining, by the software security system, that the wallet of the agent has sufficient funds to cover the first monetary value of the first action;

in response to determining that the wallet of the agent has sufficient funds, requesting, by the software security system, a first payment of the first monetary value from the agent, wherein the first payment is transferred by the agent between the wallet of the agent and the account of the owner;

in response to the account of the owner receiving the first payment, permitting, by the software security system, the first action on the computing resource;

intercepting, by the software security system, a second attempt by the agent to perform a second action on the computing resource of the computing device, thereby preventing the second action from execution;

in response to the software security system intercepting the second attempt, calculating, by the software security system, a second monetary value of the second action based at least in part on both a type of the second action and a time since the agent last attempted to perform actions on the computing device;

determining, by the software security system, that the wallet of the agent has insufficient funds to cover the first monetary value of the second action;

in response to determining that the wallet of the agent has insufficient funds, requesting, by the software security system, a second payment of the second monetary value to the account of the owner of the computing resource from the user; and in response to the account of the owner receiving the second payment, permitting, by the software security system, the second action on the computing resource.

\* \* \* \* \*

UNITED STATES PATENT AND TRADEMARK OFFICE
CERTIFICATE OF CORRECTION

PATENT NO. : 11,394,741 B1
APPLICATION NO. : 15/855690
DATED : July 19, 2022
INVENTOR(S) : Ortiz It is certified that error appears in the above-identified patent and that said Letters Patent is hereby corrected as shown below:

In the Claims

In Column 24, Line 7, in Claim 14, delete "agent y supplying," and insert -- agent by supplying, --.

Signed and Sealed this
Fourth Day of October, 2022

Katherine Kelly Vidal
Director of the United States Patent and Trademark Office